(12) United States Patent
Droulin et al.

(10) Patent No.: US 9,176,583 B2
(45) Date of Patent: Nov. 3, 2015

(54) METHOD FOR HAPTIC FEEDBACK CONTROL

(75) Inventors: Xavier Droulin, Annemasse (FR); Patrice Laurent, Annemasse (FR); Jean Marc Tissot, Annemasse (FR)

(73) Assignee: DAV, Céteil (FR)

( * ) Notice: Subject to any disclaimer, the term of this patent is extended or adjusted under 35 U.S.C. 154(b) by 298 days.

(21) Appl. No.: 13/054,388

(22) PCT Filed: Jul. 21, 2009

(86) PCT No.: PCT/EP2009/059383
§ 371 (c)(1),
(2), (4) Date: Apr. 14, 2011

(87) PCT Pub. No.: WO2010/010098
PCT Pub. Date: Jan. 28, 2010

(65) Prior Publication Data
US 2011/0181404 A1    Jul. 28, 2011

(30) Foreign Application Priority Data
Jul. 21, 2008   (FR) ..................................... 08 04132

(51) Int. Cl.
*H04B 3/36* (2006.01)
*G06F 3/01* (2006.01)
*G06F 3/0354* (2013.01)

(52) U.S. Cl.
CPC ............ *G06F 3/016* (2013.01); *G06F 3/03547* (2013.01)

(58) Field of Classification Search
None
See application file for complete search history.

(56) References Cited

U.S. PATENT DOCUMENTS

| | | | |
|---|---|---|---|
| 2002/0054060 A1* | 5/2002 | Schena | 345/701 |
| 2005/0017947 A1* | 1/2005 | Shahoian et al. | 345/156 |
| 2005/0052430 A1 | 3/2005 | Shahoian et al. | |
| 2005/0184967 A1 | 8/2005 | Yoshida et al. | |
| 2005/0243072 A1 | 11/2005 | Denoue et al. | |
| 2008/0111788 A1* | 5/2008 | Rosenberg et al. | 345/156 |

(Continued)

FOREIGN PATENT DOCUMENTS

| | | |
|---|---|---|
| JP | 2003-058321 A | 2/2003 |
| JP | 2004-530200 A | 9/2004 |
| JP | 2008-546534 A | 12/2008 |

OTHER PUBLICATIONS

International Search Report issued in PCT/EP2009/059383, mailed on Oct. 19, 2009, with translation, 4 pages.

(Continued)

*Primary Examiner* — Kerri McNally
*Assistant Examiner* — Renee Dorsey
(74) *Attorney, Agent, or Firm* — Osha Liang LLP

(57) ABSTRACT

The invention relates to a method for haptic feedback control that comprises a control device for transmitting a haptic feedback to the finger of a user in a movement area of said finger, characterized in that said control method comprises a first step (101) of determining the direction of an elementary movement of said finger and decomposing the elementary movement into components along said first and second driving directions (D1, D2), and a second step (102) of independently driving said first actuator (7*a*) and second actuator (7*b*) based on the components of the elementary movement (dU) in order to drive said plate (3) in translation so that the result of the vibratory effect generated by said actuators (7*a*, 7*b*) can be felt by said finger in a direction (dR) substantially perpendicular to and coplanar with the direction of said elementary movement (dU).

4 Claims, 3 Drawing Sheets

(56) References Cited

U.S. PATENT DOCUMENTS

Figure 4A:
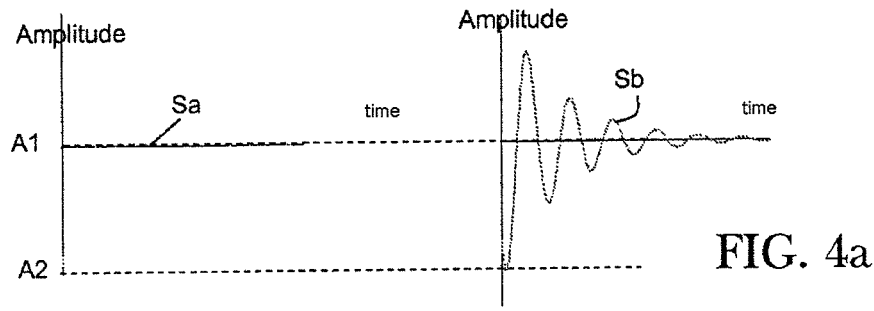

| | | | |
|---|---|---|---|
| 2008/0303782 A1* | 12/2008 | Grant et al. | 345/156 |
| 2009/0001855 A1* | 1/2009 | Lipton et al. | 310/331 |
| 2009/0007001 A1* | 1/2009 | Morin et al. | 715/773 |
| 2009/0322496 A1* | 12/2009 | da Costa | 340/407.2 |
| 2010/0013613 A1* | 1/2010 | Weston | 340/407.2 |
| 2010/0325931 A1* | 12/2010 | Rosenberg | 42/1.08 |

OTHER PUBLICATIONS

Japanese Search Report issued in corresponding Japanese Application No. 2011-519151 dated Sep. 17, 2013, and English translation thereof (17 pages).

* cited by examiner

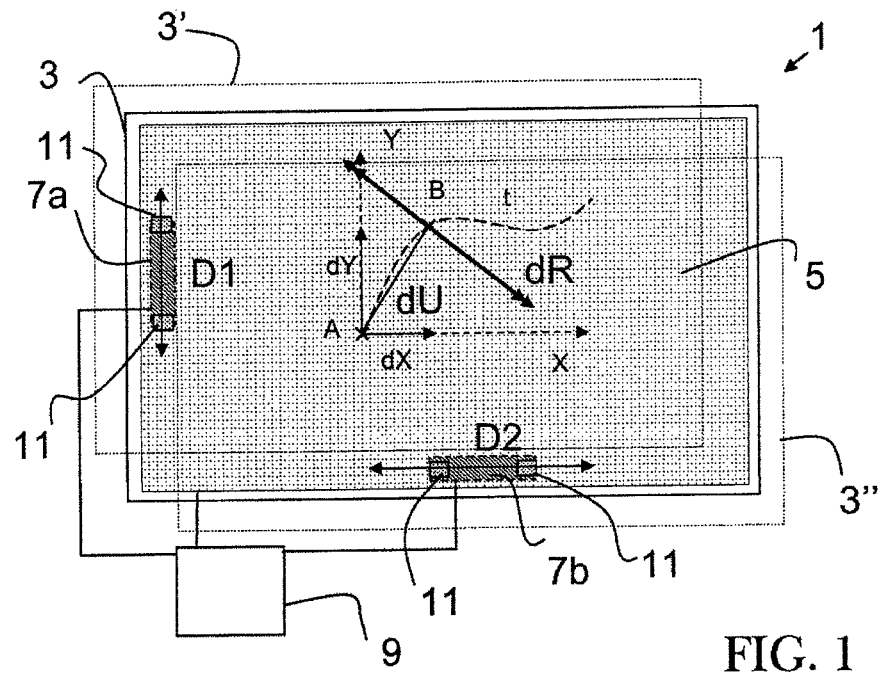
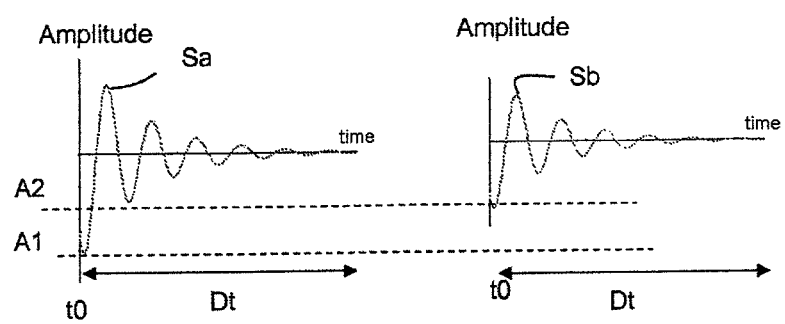
FIG. 2

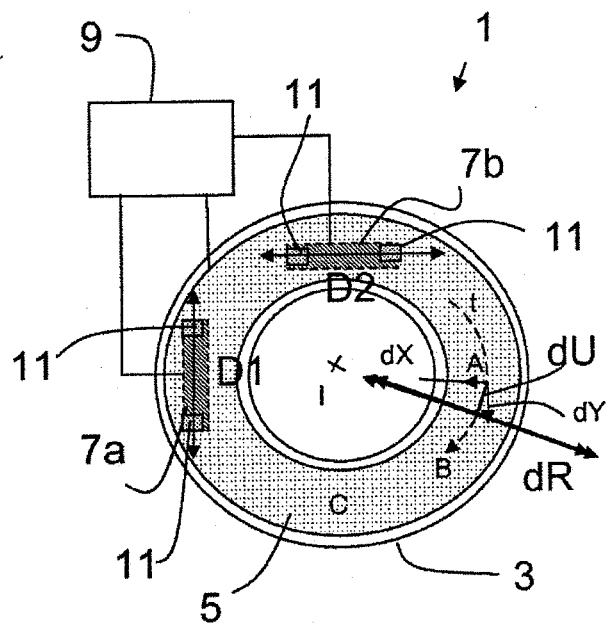
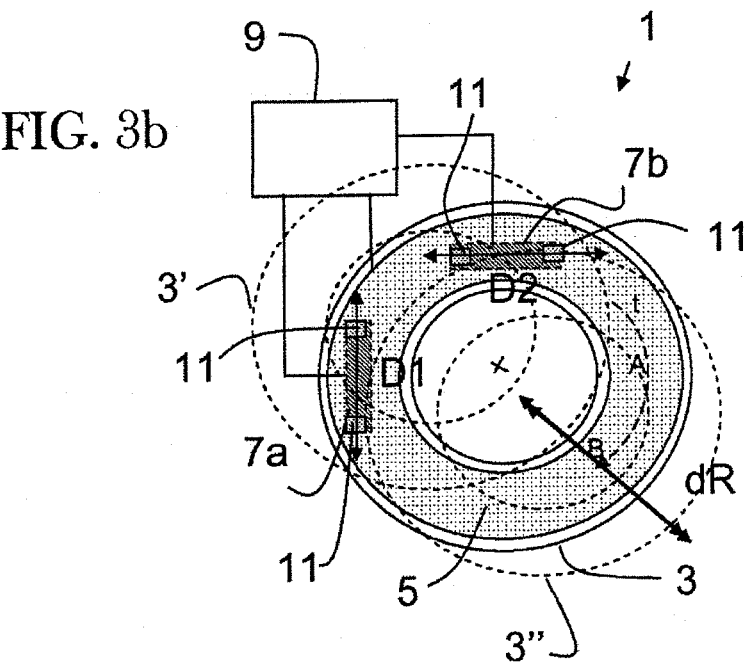

METHOD FOR HAPTIC FEEDBACK CONTROL

The present invention relates to a method for haptic feedback control for a control device comprising a backing plate capable of transmitting a haptic feedback, such as a vibration, to a user for example after the modification or the selection of a command.

Haptic feedback control devices comprising vibrators (such as vibrators of the "voice coil" type) are already known in which a magnet slides inside a coil or a coil slides inside a magnet in order to transmit a vibration to a touch-sensitive surface of the device.

Also known are other control devices comprising an actuator in which an armature slides between two coils. The AC supply of the coils makes it possible to attract the armature toward one or the other of the coils thus creating a vibratory oscillating effect.

The actuators are connected to the plate in order to generate a haptic feedback in a zone of movement of the finger of a user as a function of the detection of a command.

However, it may happen that the finger follows a command trajectory for which the vibration is slightly or poorly felt by the user.

The aim of the present invention is therefore to propose a haptic feedback control method which does not have the disadvantages of the prior art.

The object of the present invention is therefore to propose a method for haptic feedback control comprising a control device for transmitting a haptic feedback to a finger of a user in a zone of movement of said finger, said control device comprising:

- a backing plate for transmitting a haptic feedback to a finger of a user in a zone of movement of said finger,
- a sensor for sensing the movement of said finger in said zone,
- a first and a second actuator connected to said plate in order to generate the haptic feedback in said zone as a function of a signal originating from said sensor, the first actuator being capable of driving said plate in a first drive direction and the second actuator being capable of driving said plate in a second driving direction, substantially perpendicular to and coplanar with the first direction,
- a processing unit connected to said sensor in order to determine the direction of an elementary movement of said finger based on the signals originating from said sensor, the processing unit being configured to control independently the first actuator and the second actuator as a function of the components of said elementary movement according to the first drive direction and the second drive direction, characterized in that said control method comprises a first step in which the direction of an elementary movement of said finger is determined and the elementary movement is broken down into components according to said first and second drive direction, and a second step in which said first actuator and said second actuator are controlled independently as a function of the components of said elementary movement in order to drive said plate in translation so that the resultant of the vibratory effect generated by said actuators is felt by said finger in a direction substantially perpendicular to and coplanar with the direction of said elementary movement.

Therefore, the plate is driven in translation in a direction perpendicular to and coplanar with the movement of the finger so that the haptic feeling perceived by the user is enhanced and that, irrespective of the trajectory of the finger, the user perceives the vibratory effect. Similarly, the speed of movement of the finger no longer has any impact on the feeling. Specifically, the generated haptic effect is no longer mainly based on the frequency of vibration generated but also on other parameters such as the direction or the speed of movement of the plate in one direction rather than the other. The haptic effect therefore no longer depends solely on the frequency of the vibration generated which could be less well perceived when it was adjacent to that of the trajectory of the finger of the user.

According to one feature of the control method, during the second step, a parameter of control of the actuators is modulated proportionally to the components of the elementary movement of said finger.

Figure 4B:
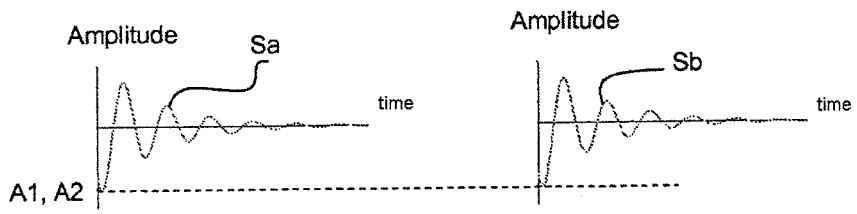
Figure 4C:
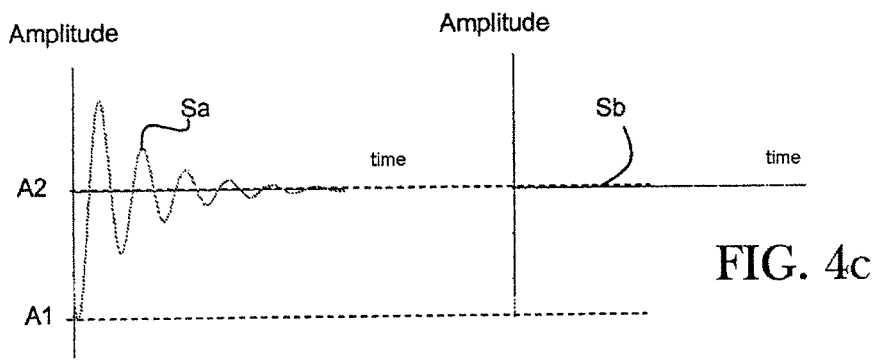
Figure 5:
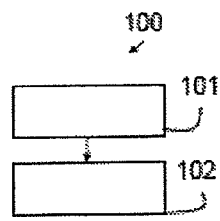

Other advantages and features will appear on reading the description of the invention and the appended drawings in which:

FIG. 1 is a schematic view of a control device according to a first embodiment,

FIG. 2 is a graph representing control signals as a function of time for actuators of the device of FIG. 1, FIGS. 3a and 3b are schematic views of a control device produced according to a second embodiment, FIGS. 4a, 4b and 4c are graphs representing control signals as a function of time for actuators of the device of FIGS. 3a and 3b and, FIG. 5 is a flowchart illustrating a control method of a control device.

In these figures, the identical elements bear the same reference numbers. For the purpose of clarity, the steps of the control method are numbered from 100.

The invention relates to a haptic feedback control device, for example for a motor vehicle control panel, for a touch-sensitive faceplate or else for a touch-sensitive screen, that can transmit a haptic feedback to a user having for example modified or selected a command.

As shown in FIG. 1, the device 1 comprises a backing plate 3 for transmitting a haptic feedback to a finger of a user in a zone of movement of the finger, a sensor 5 for sensing the movement of the finger in the zone and a first and a second actuator 7a, 7b connected to the plate 3 in order to generate the haptic feedback in the zone as a function of a signal originating from the sensor 5.

The haptic feedback is for example a vibration produced by a sinusoidal control signal or by a control signal comprising one or a succession of pulses.

In the example of FIG. 1, the device 1 comprises two actuators 7a, 7b, shown in dotted lines, beneath the backing plate 3.

Each actuator 7a, 7b comprises a fixed portion and a portion that can move in translation in a gap of the fixed portion for example of the order of 200 μm, between a first and a second position, parallel to a longitudinal axis of the movable portion. The movable portion is for example formed by a movable magnet sliding inside a fixed coil or by a movable coil sliding around a fixed magnet, the movable portion and the fixed portion interacting by electromagnetic effect.

The movable portions are connected to the plate 3 so that the movement of the movable portions causes the movement in translation of the plate 3 in order to generate the haptic feedback to the finger of the user in the zone of movement.

The movement sensor 5 comprises a sensor with a touch-sensitive surface supported by the backing plate 3 in the zone of movement of the finger. A pressure sensor with a touch-sensitive surface such as a pressure sensor with a touch-sensitive surface of FSR (for Force Sensing Resistor) technology, that is to say using pressure-sensitive resistors, is provided.

These sensors comprise flexible semiconducting layers sandwiched between for example a conductive layer and a resistive layer. By exerting a pressure or a sliding action on the FSR layer, its ohmic resistance reduces thus making it possible, by application of an appropriate electric voltage, to measure the pressure applied and/or the location of the place where the pressure is exerted.

According to a different concept of FSR technology, the touch-sensitive sensor comprises two flexible sheets of support spaced apart from one another by elastic spacers and supporting on mutually facing faces elements making it possible to make an electric contact when the sensor is compressed.

The device 1 also comprises a processing unit 9 connected to the sensor 5 in order to determine, in real time, the direction of an elementary movement dU of the finger based on signals originating from the sensor 5. The direction of the elementary movement dU is for example deduced from two successive items of positional information originating from the movement sensor 5.

The first actuator 7a is capable of driving the plate 3 in a first drive direction D1, the second actuator 7b is capable of driving the plate 3 in a second drive direction D2 and the processing unit 9 is configured to control independently the first actuator 7a and the second actuator 7b as a function of the components dX, dY of the elementary movement dU according to the first drive direction D1 and the second drive direction D2.

According to one embodiment, the processing unit 9 is configured to modulate at least one control parameter of the actuators 7a, 7b.

The controlling of the actuators 7a, 7b relative to the components dX, dY, carried out by the modulation of a control parameter of the actuators 7a, 7b, makes it possible to generate a haptic effect felt in a direction of propagation dR dependent on the trajectory t made by the control finger.

The control parameter is a control signal of the actuator, for example the amplitude of the supply current applied to the terminals of the actuators 7a, 7b.

The actuators 7a and 7b are therefore motive respectively in the drive directions D1 and D2. However, in order to allow the movement of the plate 3, the means 11 of connection between the plate 3 and the actuators 7a and 7b are designed to be deformable so as to allow a movement of the plate 3 relative to the actuators 7a, 7b in the nonmotive directions. The connection means are for example made of plastic.

Therefore, the first actuator 7a is motive in the direction D1 and the connection 11 between the plate 3 and the movable portion of the first actuator 7a can be deformed notably in the direction D2. Similarly, the second actuator 7b is motive in the direction D2 and the connection 11 between the plate 3 and the movable portion of the second actuator 7b can be deformed notably in the direction D1.

The processing unit 9 is configured to modulate at least one control parameter of the actuators 7a, 7b so that the resultant of the vibratory effect generated by said actuators 7a, 7b is felt by the finger in a direction dR substantially perpendicular to and coplanar with the direction of elementary movement dU.

Therefore, the plate 3 is driven in translation in a direction perpendicular to and coplanar with the movement of the finger so that the haptic feeling perceived by the user is improved and that, irrespective of the trajectory of the finger, the user perceives the vibratory effect. Similarly, the speed of movement of the finger no longer has any impact on the feeling. Specifically, the generated haptic effect is no longer mainly based on the frequency of vibration generated but also on other parameters such as the direction or the speed of movement of the plate 3 in one direction rather than in the other. The haptic effect therefore no longer depends solely on the frequency of the generated vibration which could be less well perceived when it was adjacent to that of the trajectory of the finger of the user.

The first actuator 7a is configured to drive the plate 3 in translation in the first drive direction D1 and the second actuator 7b is configured to drive the plate 3 in translation in the second drive direction D2 perpendicular to and coplanar with the first direction D1. For this, the movable portions are fixed in drive directions D1, D2 of the plate 3 substantially orthogonal to and coplanar with the sensor 5.

The actuators 7a and 7b are therefore motive respectively in the orthogonal drive directions D1 and D2 and the connection means 11 between the plate 3 and the actuators 7a and 7b allow a movement in the other directions.

FIG. 1 shows an example of a trajectory t of the finger of a user in a zone of movement of the device 1.

The direction of an elementary movement dU of the finger between the points A and B on the trajectory t of the finger is determined based on the signals originating from the sensor 5.

The elementary movement dU of the finger is broken down into a component dX and a component dY on the two axes X and Y of the orthogonal coordinate system formed by the drive directions D1 and D2 of the actuators 7a and 7b.

The processing unit 9 modulates for example in a proportional manner the amplitude of the intensity of the control signals Sa and Sb of the actuators 7a, 7b as a function of the components dX and dY of the elementary movement dU (FIG. 2).

In this example, periodic control signals, damped and in phase from the initial time t0 are applied to the two actuators 7a, 7b so as to generate an isolated haptic effect. An isolated haptic effect may be generated when, for example, the finger of the user changes selection in a drop-down command menu.

Then, for each moment of a predefined period of application Dt, the control signal Sa of the actuator 7a has an intensity of amplitude that is greater than for the control signal Sb of the actuator 7b, the component dY in the drive direction D1 of the actuator 7a being greater than the component dX in the drive direction D2 of the actuator 7b.

In other situations not represented, for which the elementary movement is substantially parallel to an axis X or Y, the control signals are modulated by the processing unit 9 so that the actuator capable of driving the plate in translation in the direction perpendicular to and coplanar with the elementary movement, has a virtually maximal intensity of amplitude.

At the same time, the other actuator, capable of driving the plate 3 in translation in a direction parallel to the elementary movement, then has a virtually zero intensity.

The resultant of the vibratory effect generated by the actuators 7a, 7b is then preferably felt by the finger in a direction of propagation dR (represented by a double arrow in FIG. 1), that is to say perpendicular to the direction of the elementary movement dU.

To make this clearer, shown in dotted lines and in an exaggerated manner are two positions 3' and 3", shifted by a few hundreds of micrometers, of the plate 3 in translation in the direction of propagation dR perpendicular to the trajectory t.

According to another embodiment shown in FIGS. 3a and 3b, the zone of movement has an annular shape with a center I.

In the same manner, the elementary movement dU of the finger is broken down into a component dX and a component dY on the two axes X and Y of the orthogonal coordinate system formed by the directions of movement D1 and D2 of the actuators 7a and 7b.

In this example, periodic control signals Sa, Sb, damped and in phase from the initial time t0 are applied to the two actuators 7a, 7b (FIGS. 4a, 4b, 4c).

When the finger of the user is at the point A in the zone of movement (FIG. 3a), the elementary movement dU is practically parallel to the drive direction D1 of the first actuator 7a.

The control signal Sa of the second actuator 7b then has a virtually maximal amplitude A2 while the first actuator 7a has a virtually zero amplitude A1 (FIG. 4a).

Then, when the finger of the user is at the point B in the zone of movement (FIG. 3a), the elementary movement dU has a component dX and a component dY that are virtually equal. The control signals Sa, Sb of the actuators 7a and 7b then have virtually equal amplitudes A1, A2 (FIG. 4b).

FIG. 3b illustrates in an exaggerated manner and in dotted lines the plates 3' and 3" moved in the radial direction of propagation dR of the haptic effect corresponding to the trajectory t travelled by the finger of the user, at the point B. It is noted that the moved plates 3', 3" are off-center relative to the center I of the plate 3 in the position of rest.

Finally, when the finger of the user is at the point C in the zone of movement (FIG. 3a), the elementary movement dU is practically parallel to the direction of drive D2 of the second actuator 7b.

The control signal Sa of the second actuator 7b then has a virtually zero amplitude A2 while the first actuator 7a has a virtually maximal amplitude A1 (FIG. 4c).

The resultant of the vibratory effect generated by the actuators 7a, 7b is then felt by the finger in a radial direction dR substantially perpendicular to the direction of elementary movement dU.

In this way it is possible to simulate a mechanical thumb-wheel by a flat surface generating a haptic feedback in order, for example, to inform a user of a change of command or of the selection of a command in a drop-down menu, for example in order to inform the user of a change in temperature through a touch-sensitive haptic feedback.

FIG. 5 represents a flowchart of the control method with haptic feedback 100 comprising a control device 1 for the successive application of a first step 101 and a second step 102.

In the first step 101, the direction of an elementary movement dU of the finger is determined and the elementary movement dU is broken down into components dX, dY in a first and a second drive direction D1, D2.

Then, in a second step 102, the first actuator 7a and the second actuator 7b are controlled independently as a function of the components dX, dY of said elementary movement dU.

A parameter of the control signals of the actuators 7a, 7b is modulated in proportion to the components dX, dY of the elementary movement dU of said finger.

For example, a parameter of the control signals of the actuators 7a, 7b is modulated as a function of the components dX, dY of the elementary movement dU so that the resultant of the vibratory effect generated by the actuators 7a, 7b is felt by the finger in a direction dR that is substantially perpendicular to the direction of the elementary movement dU.

Advantage is taken of the duration of application Dt of the signals S1 and S2 to reiterate the first step 101 for the determination of the next elementary movement dU.

Then, the steps 101, 102 are reiterated for the next elementary movement until the sensor 5 no longer detects any movement.

It is understood that, by generating a haptic feedback substantially perpendicular to the finger, the user perceives the haptic feedback irrespective of the operating frequencies.

The invention claimed is:

1. A method for haptic feedback control comprising:
transmitting, by a control device, a haptic feedback to a finger of a user in a zone of movement of said finger, wherein said control device comprises:
a backing plate for transmitting the haptic feedback to the finger of the user in the zone of movement of said finger,
a sensor for sensing a trajectory of said finger in said zone,
a first actuator and a second actuator connected to said plate to generate the haptic feedback in said zone as a function of a signal originating from said sensor, the first actuator being capable of driving said plate in a first drive direction and the second actuator being capable of driving said plate in a second driving direction, substantially perpendicular to and coplanar with the first direction,
a deformable connecting means disposed between each of said first and second actuators and said backing plate for allowing displacement of said backing plate relative to each of said first and second actuators in non-driving directions thereof, and
a processing unit connected to said sensor to determine the direction of an elementary movement of said finger based on the signals originating from said sensor, the processing unit being configured to control independently the first actuator and the second actuator as a function of the components of said elementary movement according to the first drive direction and the second drive direction;
determining the direction of an elementary movement of the trajectory of said finger;
breaking down the elementary movement into components according to said first and second drive directions; and
independently controlling said first actuator and said second actuator as a function of the components of said elementary movement to drive said plate in translation so that the result of a vibratory effect generated by said actuators is felt by said finger in a direction substantially perpendicular to and coplanar with the direction of said elementary movement.

2. The control method as claimed in claim 1, wherein, during the independent controlling of the first and second actuator, a parameter associated with control of the actuators is modulated proportionally to the components of the elementary movement of said finger.

3. The control method as claimed in claim 1, wherein said first and second actuators comprise a fixed part and a mobile part for movement between a first position and a second position, said movements of said first and second actuators parallel to longitudinal axes of said backing plate.

4. The control method as claimed in claim 1, wherein said deformable connecting means is made of plastic.

* * * * *